Sept. 9, 1952     C. G. H. LILLEY     2,609,719

SELF-EJECTING CHUCK KEY

Filed Nov. 18, 1949

Inventor

Chester G.H. Lilley

Patented Sept. 9, 1952

2,609,719

UNITED STATES PATENT OFFICE 2,609,719

SELF-EJECTING CHUCK KEY

Chester G. H. Lilley, Mount Rainier, Md.

Application November 18, 1949, Serial No. 128,083

4 Claims. (Cl. 81—90)

This invention relates to new and useful improvements and structural refinements in chuck keys, more particularly, in a chuck key such as is disclosed in United States Patent No. 2,012,147 granted to A. M. Stoner on August 30, 1935, the principal object of the instant invention being to eliminate the danger and possible injury such as may result from the chuck key being forgotten in the chuck and subsequently permitted to rotate with the latter.

This object is achieved by the provision of means on the chuck key for automatically ejecting the same from the chuck as soon as the jaws of the latter are tightened or loosened, the nature of this improvement being such that it is readily adaptable to chuck keys of conventional type.

Some of the advantages of the invention reside in its simplicity of construction, in the safety of its operation and in its adaptability to economical manufacture.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
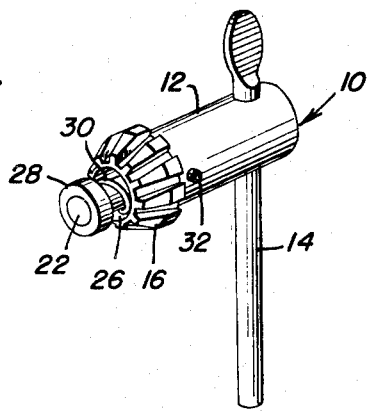
Figure 1 is a perspective view of the invention.

Referring now to the accompanying drawings in detail, the invention is embodied in a chuck key designated generally by the reference character 10, this being basically the same as the key disclosed in United States Patent No. 2,012,147 granted to A. M. Stoner on August 20, 1935.

The key 10 embodies in its construction a substantially cylindrical body 12 provided in one end portion thereof with a handle 14 while its remaining end portion is formed integrally with means, namely, a gear 16 which is operatively engageable with a jaw actuating member 18 of a chuck 20.

The body 12 is also provided with a longitudinally projecting, cylindrical stud 22 which is rotatably receivable in a hole or aperture 24 formed in the chuck 20, whereby the entire key is properly located while the members 16, 18 are in engagement during actuation of the chuck jaws, as is the conventional practice.

The instant invention resides in the provision of means for automatically ejecting the key 10 from the chuck 20 as soon as there occurs a relaxation of manual pressure which retains the stud 22 in the hole 24, these means involving the formation of an annular bore 26 in the body 12 around the stud 22, substantially as shown.

Figure 2:
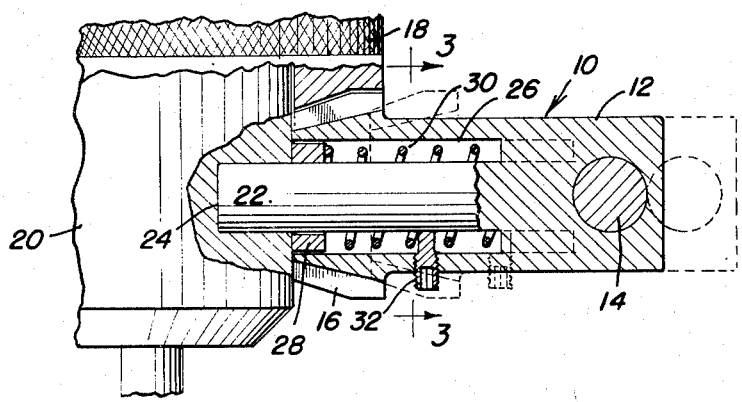
Figure 2 is a longitudinal sectional view thereof, showing the same applied to a chuck.
Figure 3:
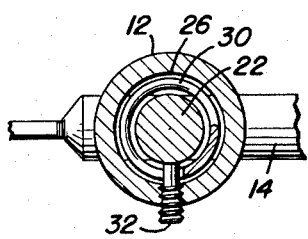
Figure 3 is a cross sectional detail, taken substantially in the plane of the line 3—3 in Figure 2.

An annular chuck engaging member 28 is slidably positioned on the stud 22 and is receivable in the bore 26, while a compression spring 30, also positioned on the stud 22 in the bore 26, has one end thereof rigidly secured to the member 28 in any suitable manner. The resiliency of the spring 30 is such so as to urge the member 28 outwardly from the bore 26, but in addition, the spring 30 performs a second function, namely, that of preventing the member 28 from becoming separated from the stud 22, this being achieved by the provision of a set screw 32 which extends laterally through the body 12 into the bore 26 and engages the spring 30 between two adjacent coils of the latter, as is illustrated in Figure 2.

As a result, the spring 30 cannot be stretched sufficiently to facilitate separation of the member 28 from the stud 22, and, at the same time, the resiliency of the spring will urge the member 28 outwardly from the bore 26, so that as soon as manual pressure retaining the stud 22 in the hole 24 is relaxed, the spring 30, through the medium of the engagement of the member 28 with the chuck 20, will automatically eject the stud 22 from the hole 24 and will thus prevent any possibility of the chuck key being forgotten in the chuck and subsequently permitted to rotate with the latter.

In the event that the member 28 or the spring 30 require replacement, the same may be readily accomplished by simply loosening the screw 32, as will be clearly apparent.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a self-ejecting chuck key, the combination of a body provided at one end thereof with an integral gear for operatively engaging a jaw actuating member of a chuck, said body having a bore, a cylindrical stud integral with said body and coaxially disposed in said bore and receivable in a locating hole of the stated chuck, an annular chuck engaging member slidable on said stud, and a coiled spring mounted coaxially of said stud and within said bore for sliding said chuck engaging member toward the outer end of said stud, one end of said spring being secured to said annular member, and means to secure the spring against withdrawal from said bore.

2. In a self-ejecting chuck key, the combination of a body provided at one end thereof with an integral gear for operatively engaging a jaw actuating member of a chuck, said body having a bore, a cylindrical stud integral with said body and coaxially disposed in said bore and receivable in a locating hole of the stated chuck, an annular chuck engaging member slidable on said stud, a coiled spring mounted coaxially of said stud and within said bore for sliding said chuck engaging member toward the outer end of said stud, one end of said spring being secured to said annular member, and means to secure the spring against withdrawal from said bore, and preventing separation of said chuck engaging member from said stud, said annular member being retractable within said bore and said gear when the key is operatively applied to a chuck, and being normally disposed outside said bore and gear when in inoperative position.

3. In a self-ejecting chuck key, the combination of an elongated body provided in one end portion thereof with an annular bore defining a cylindrical stud which projects outwardly beyond the end of said body for reception in a locating hole of a chuck, means on said body adjacent the outer end of said stud for operatively engaging a jaw actuating member of the stated chuck, an annular chuck engaging member slidable on said stud and receivable in said bore, a compression spring positioned on the stud for sliding said chuck engaging member outwardly from the bore, and means for preventing separation of said chuck engaging member from said stud.

4. The device as defined in claim 3 wherein said last mentioned means comprise a set screw extending laterally through said body into said bore and engaging said spring, said spring having its outer end secured to said member.

CHESTER G. H. LILLEY.

REFERENCES CITED

The following references are of record in the file of this patent:

UNITED STATES PATENTS

| Number | Name | Date |
| --- | --- | --- |
| 975,174 | Stock et al. | Nov. 8, 1910 |
| 1,006,144 | Stock | Oct. 17, 1911 |
| 2,387,981 | Davis | Oct. 30, 1945 |
| 2,388,414 | Jernigan | Nov. 6, 1945 |
| 2,390,545 | Lang | Dec. 1, 1945 |